US009552338B2

(12) United States Patent
Li et al.

(10) Patent No.: US 9,552,338 B2
(45) Date of Patent: Jan. 24, 2017

(54) MECHANISMS TO COMPOSE, EXECUTE, SAVE, AND RETRIEVE HYPERLINK PIPELINES IN WEB BROWSERS

(71) Applicant: Futurewei Technologies, Inc., Plano, TX (US)

(72) Inventors: Li Li, Bridgewater, NJ (US); Wu Chou, Basking Ridge, NJ (US); Tao Cai, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 512 days.

(21) Appl. No.: 13/793,066

(22) Filed: Mar. 11, 2013

(65) Prior Publication Data

US 2014/0258822 A1 Sep. 11, 2014

(51) Int. Cl.
*G06F 17/24* (2006.01)
*G06F 17/22* (2006.01)
*G06F 17/30* (2006.01)

(52) U.S. Cl.
CPC .......... *G06F 17/2235* (2013.01); *G06F 17/24* (2013.01); *G06F 17/243* (2013.01); *G06F 17/30014* (2013.01)

(58) Field of Classification Search
CPC ...... G06F 17/30; G06F 17/2235; G06F 17/24; G06F 17/243; G06F 17/30014
USPC ................................................. 715/206, 208
See application file for complete search history.

(56) References Cited

U.S. PATENT DOCUMENTS

| | | | | |
|---|---|---|---|---|
| 6,823,379 | B1* | 11/2004 | Heckel et al. | 709/224 |
| 8,949,712 | B1* | 2/2015 | Days | G06F 17/2247 |
| | | | | 715/204 |
| 2002/0199014 | A1* | 12/2002 | Yang et al. | 709/238 |
| 2003/0110384 | A1* | 6/2003 | Carro | 713/181 |
| 2004/0054701 | A1* | 3/2004 | Garst | 708/131 |
| 2004/0078451 | A1* | 4/2004 | Dietz et al. | 709/217 |
| 2005/0050066 | A1* | 3/2005 | Hughes | 707/100 |
| 2006/0155728 | A1* | 7/2006 | Bosarge | 707/100 |
| 2008/0147556 | A1* | 6/2008 | Smith et al. | 705/57 |
| 2009/0018988 | A1* | 1/2009 | Abrams et al. | 707/2 |
| 2009/0164502 | A1* | 6/2009 | Dasgupta | G06F 17/30887 |
| 2009/0252159 | A1* | 10/2009 | Lawson et al. | 370/352 |

(Continued)

OTHER PUBLICATIONS

"PPTools—How to merge Hyperlinks", Jan. 9, 2009, PowerTools for PowerPoint (R), Copyright (c) Rindsberg Photography, Inc dba PPTools, Design based on one by Andrea Viklund, pp. 3.*

(Continued)

*Primary Examiner* — Chau Nguyen
(74) *Attorney, Agent, or Firm* — Conley Rose, P.C.

(57) ABSTRACT

A method for composing and executing a plurality of hyperlink pipelines within a web browser, wherein the method comprises moving a first source hyperlink that corresponds to a first resource to a destination hyperlink that corresponds to a second resource, merging the first source hyperlink with the destination hyperlink to create a first hyperlink pipeline, moving a second source hyperlink that corresponds to a third resource to the first hyperlink pipeline, merging the second source hyperlink with the first hyperlink pipeline to create a second hyperlink pipeline, and executing the second hyperlink pipeline such that the second resource is invoked before the first resource and the third resource, and the first resource is invoked before the third resource.

20 Claims, 7 Drawing Sheets

(56) References Cited

U.S. PATENT DOCUMENTS

| | | | |
|---|---|---|---|
| 2010/0005069 A1* | 1/2010 | Wang | 707/3 |
| 2010/0146376 A1* | 6/2010 | Reams | 715/208 |
| 2010/0161765 A1* | 6/2010 | Yang | 709/219 |
| 2011/0078232 A1* | 3/2011 | Van Den Driessche | 709/203 |
| 2011/0169907 A1* | 7/2011 | Bozionek et al. | 348/14.01 |
| 2011/0173230 A1* | 7/2011 | Winterbottom et al. | 707/770 |
| 2011/0209069 A1* | 8/2011 | Mohler | 715/744 |
| 2011/0289394 A1* | 11/2011 | Roh et al. | 715/205 |
| 2012/0304275 A1* | 11/2012 | Ji et al. | 726/11 |
| 2013/0173367 A1* | 7/2013 | Beighley, Jr. | 705/14.16 |
| 2013/0181886 A1* | 7/2013 | Hill | 345/2.3 |

OTHER PUBLICATIONS

Fielding, R., et al., "Hypertext Transfer Protocol—HTTP/1.1," Network Working Group, RFC 2616, Jun. 1999, 177 pages.

Gregorio, J., et al., "URI Template," Internet Engineering Task Force, RFC 6570, Mar. 2012, 34 pages.

Hickson, Ian, Standard, "Living Standard," HTML Standard, http://www.whatwg-org/specs/web-apps/current-work/, Last updated Jan. 23, 2013, Downloaded from the Internet Jan. 24, 2013, 1169 pages.

Ennals, Robert, "Intel Mash Maker: Mashups for the Masses," http://software.intel.com/en-us/articles/intel-mash-maker-mashups-for-the-masses/, downloaded from Internet on Feb. 21, 2013, 2 pages.

Billock, Greg, et al., "Web Intents, W3C Working Draft," http://www.w3.org/TR/web-intents/, dated Jun. 26, 2012, 10 pages.

Barreto, Charlton, et al., "Web Services Business Process Execution Language Version 2.0," https://www.oasis-open.org/committees/download.php/23964/wsbpel-v2.0-primer.htm, dated May 2007, 62 pages.

Yahoo, "Pipes," Http://pipes.yahoo.com/pipes/docs?doc=overview, downloaded from the Internet on Feb. 21, 2013, 1 page.

\* cited by examiner

MECHANISMS TO COMPOSE, EXECUTE, SAVE, AND RETRIEVE HYPERLINK PIPELINES IN WEB BROWSERS

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern web browsers are a computing platform on which web applications of various kinds, such as Email, search, and WebRTC, from different web sites can be executed at the same time. However, today's web browsers limit the ability of web users, web developers, and/or web sites to customize the resources. For example, today's web browsers are generally limited to customizing resources based on user profiles and context information. Today's web browsers are unable to combine resources from different web sites for a web user. As a result, the World Wide Web Consortium (W3C) and Internet Engineering Task Force (IETF) are in the process of standardizing relevant APIs and protocols in order to improve the WebRTC experience for web users, web developers, and web sites.

A variety of solutions exist in improving the customization options for resources. One solution involves the implementation of web mash-up tools. Web mash-up tools provide web users, web developers, and web sites an increase in the degree of customization through the use of dynamic and function compositions. Unfortunately, web mash-up tools are often very complex and difficult to implement using the current web infrastructure. In some instances, an overhaul of the existing framework of web sites and web browsers are needed to utilize the web mash-up tool. For instance, many of the web mash-up tools (e.g. YAHOO PIPES) may use dedicated composition servers for users to specify data workflows. Moreover, the web mash-up tools may use new web applications that include new function modules to implement a variety of functions that include fetching data from different sites, and transforming, filtering, and combining the data into a new web page. Therefore, web mash-up tools excessively modify the current web infrastructure in order to provide customization features for resources within a web browser.

An alternative to the web mash-up tools is the use of Web Intents currently being standardized by the W3C. Web Intents adapt the concept of intent and activity design patterns from the ANDROID operating system (OS) to web browsers. Web browsers adapted with Web Intents may be able to handle an action on the user's behalf by finding appropriate resources based on the user's preference. Although Web Intents may be relatively straight forward to implement into current web-browsers, Web Intent may not support a variety of customization options. For example, web browsers adapted with Web Intents are unable to customize the resource selections once a web page is loaded into the web browser. Additionally, users are unable to create and customize different intent compositions. Hence, to improve the WebRTC experience, a less complex but a more powerful solution is needed to customize a variety of resources within a web browser.

SUMMARY

In one embodiment, the disclosure includes an apparatus for forming a hyperlink pipeline that organizes a plurality of resources within a web browser, comprising a processor configured to acquire a source hyperlink comprising a Uniform Resource Identifier (URI) that identifies a first resource, acquire a destination hyperlink comprising a destination URI that identifies a second resource and a variable within a URI template, and substitute the source URI for the variable within the URI template when the source hyperlink merges with the destination hyperlink to form the hyperlink pipeline, wherein the URI is represented as a Uniform Resource Locator (URL), a URI reference, or a Uniform Resource Name (URN).

In yet another embodiment, the disclosure includes an apparatus for forming a hyperlink pipeline that organizes a plurality of hyperlinks within a web browser, comprising a processor configured to create a factory module, wherein the factory module comprises a template attribute that indicates a Uniform Resource Identifier (URI) template, wherein the URI template comprises a variable, a name attribute that indicates the name of the variable, a type attribute that indicates a list of accepted media type for the variable, and a pipeline attribute that indicates the URI of the hyperlink pipeline and form a hyperlink pipeline by substituting a source URI that corresponds to a source hyperlink into the variable.

In yet another embodiment, the disclosure includes a method for composing and executing a plurality of hyperlink pipelines within a web browser, wherein the method comprises moving a first source hyperlink that corresponds to a first resource to a destination hyperlink that corresponds to a second resource, merging the first source hyperlink with the destination hyperlink to create a first hyperlink pipeline, moving a second source hyperlink that corresponds to a third resource to the first hyperlink pipeline, merging the second source hyperlink with the first hyperlink pipeline to create a second hyperlink pipeline, and executing the second hyperlink pipeline such that the second resource is invoked before the first resource and the third resource, and the first resource is invoked before the third resource.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, an apparatus, and a system that may be used to create, execute, save, and retrieve hyperlink pipelines that invoke resources within a web browser. A user may create a hyperlink pipeline of varying length using an assortment of computing-based commands, such as dragging-and-dropping and/or copying-and-pasting different hyperlinks. Hyperlinks used to form the hyperlink pipeline may comprise a hyperlink factory module that may dictate if and how hyperlinks may be combined together. Each of the hyperlinks used to form the hyperlink pipeline may reference one or more resources (e.g. video chatting) that originate from one or more web services. After the creation of a hyperlink pipeline, the user may activate the hyperlink pipeline (e.g. by clicking on the hyperlink pipeline) and execute a series of hyperlinks based on a user-specified order. The user may arrange the hyperlinks within the hyperlink pipeline in a specified order during the construction of the hyperlink pipeline. The hyperlink pipeline may be saved into a local or remote storage by storing the pipeline factory and pipeline module. The hyperlinks within a hyperlink pipeline may be updated and validated each time a user re-accesses the web browser.

Figure 1:
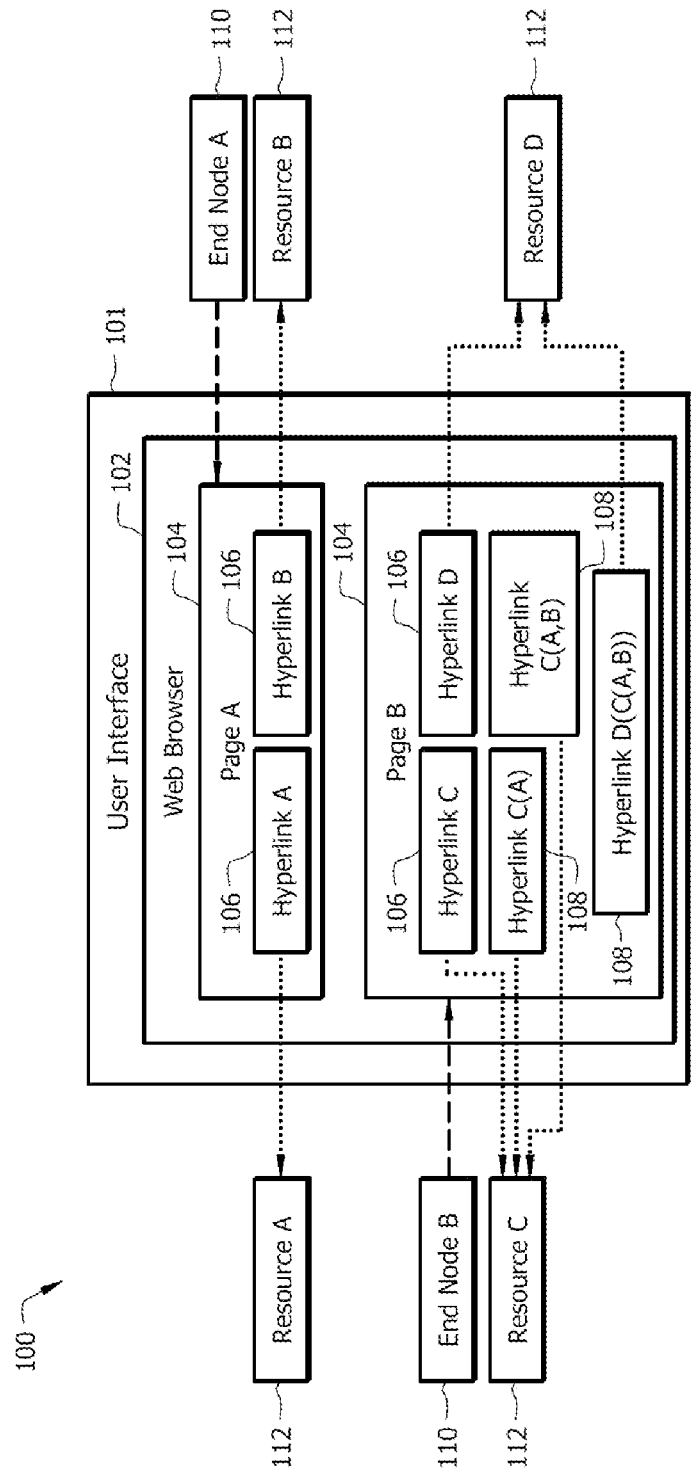
FIG. 1 is a schematic diagram of an embodiment of a system used to create hyperlink pipelines within a web browser.

FIG. 1 is a schematic diagram of an embodiment of a system 100 used to create hyperlink pipelines 108 within a web browser 102. In one embodiment, system 100 may be based on the Representational State Transfer (REST) architecture, such as the World Wide Web. System 100 may comprise a user interface 101 and end nodes 110. End nodes 110 may include, but are not limited to, servers, hosts, storage devices and/or any combination of devices that may originate data into or receive data from system 100. End nodes 110 may be used to host web sites that can be accessed publicly (e.g. the Internet) and/or through a private network (e.g. virtual private network). User interface 101 may encompass a variety of devices, such as personal computers, cellular phones, IP devices (e.g. tablets), video-audio devices (e.g. televisions), and/or any device capable of operating a web browser 102. The user interface 101 may comprise a local storage component that may be used to save information relating to hyperlink pipelines 108. User interface 101 may be configured to use a variety of input devices that include, but are not limited to a keyboard, mouse, touch screen and/or video imaging/conferencing equipment.

User interface 101 may be configured to operate and display information within one or more web browsers 102. Users, such as web users, web developers, and/or web site operators, may interact with the user interface 101 using web browser 102 to access to a variety of resources 112. Web browser 102 may be any software application for retrieving, presenting, and traversing resources 112 from system 100, such as CHROME, FIREFOX, INTERNET EXPLORER, OPERA, and SAFARI. In one embodiment, web browser 102 may be configured to access, retrieve, and view documents, web applications and web services from the Internet. Some of these web services and web applications may include, but are not limited to voice calling, video chat, and peer-to-peer file sharing. The web browser 102 may be integrated with voice and video engines and configured to operate resources 112 without the installation of plug-ins and/or other add-ons. Web browser 102 may be stored in a memory component within the user interface 101. Moreover, the user interface 101 may comprise processing unit (e.g. central processing unit (CPU)) that may be used to load web browser 102 within user interface 101 and execute web services and applications within web browser 102.

Web browser 102 may be configured to access one or more pages 104 that may be encoded in HTML, extensible HTML (XHTML), and/or other types of markup language. Web browser 102 may be able to view pages 104, such as public websites and/or intranet sites, which may be hosted by end nodes 110. In FIG. 1, page A 104 may be a web page that is hosted by end node A 110, while page B 104 may be a web page hosted by end node B 110. Another embodiment of system 100 may have one of the end nodes 110 (e.g. end node A 110) host information shown in for both pages A and B 104.

Pages 104 may comprise hyperlinks 106 that may navigate the web browser 102 to different resources 112. Resource 112 may be identified by a URI and may include web pages, images, videos, calendars, real-time communications (e.g. video chat), and/or any other type of web service or web application. Resources 112 may be video data, audio data, text data, and any other types of data that may be displayed and/or executed using web browser 102. Resources 112 may be stored on one or more end nodes 110 and may be distributed remotely on different web services. FIG. 1 illustrates that resources A and B 112 may be stored within end node A 110, while resources C and D 112 may be stored within end node B 110. Prior to executing the hyperlinks 106, resource authorizations, such as OAuth, Kerberos, and Hypertext Transfer Protocol Secure (HTTPS), may have been granted to access resources 112 via hyperlinks 106.

Web browser 102 may invoke resources 112 referenced by hyperlinks 106 when a user executes hyperlinks 106 (e.g. a user clicks on the hyperlink). For example, FIG. 1 illustrates that hyperlinks A-D 106 are associated with resources A-D 112, respectively. When a user clicks on hyperlink A 106, the web browser 102 may invoke resource A 112 by accessing resource A 112 and sending the information back to web browser 101 to perform the service (e.g. video chat) associated with resource A 112. The service associated with resource A 112 may be displayed and/or performed on page A 104 or on a new page 104 (not shown in FIG. 1) within web browser 102. Furthermore, when a user clicks on hyperlink C 106, the web browser 102 may access resource C 112 and perform the service associated with resource C on page B 104 or on a new page 104 (not shown in FIG. 1) within web browser 102. Hyperlinks 106 may be displayed on the page 104 in variety of formats such as a text, an image, a symbol, a short video clip, pop-up windows, and/or any combination thereof. Using FIG. 1 as an example, hyperlink A 106 may be displayed as text "hyperlink A" within page A 104. In another embodiment, hyperlink A 106 may be displayed as an image of web camera or video camcorder when resource A 112 provides a video-chatting service. Invoking resources 112 will be discussed in more detail in FIG. 3.

In addition to hyperlinks 106, pages 104 may also comprise hyperlink pipelines 108. Hyperlink pipelines 108 may comprise a plurality of hyperlinks 106 arranged in a sequential order that may be dictated by a user. Hyperlink pipelines 108 may be displayed on pages 104 substantially similar to hyperlinks 106. When a user views pages 104, the user may recognize hyperlinks 106 that may be used to form a hyperlink pipeline 108. For example, the web browser 102 may display text surrounding the hyperlinks 106 that may indicate whether a user may form a hyperlink pipeline 108 using the hyperlinks 106. The hyperlink pipelines may be created such that system 100 does not use a dedicated end node 110 (e.g. a composition server) to specify the order of execution for the hyperlink pipelines 108. Furthermore, a web browser may not need a web browser extension to create the hyperlink pipelines 108.

In one embodiment, the user may create hyperlink pipelines 108 by selecting and dragging the source hyperlink into a destination hyperlink. A source hyperlink may be the hyperlink 106 that a user selects, moves, and/or copies to combine with another hyperlink 106, which may be referred to as the destination hyperlink. For example, hyperlink pipeline C(A) 108 may comprise hyperlink A and C 106 and may be displayed as text "hyperlink C(A)" on page B 104. Moreover, hyperlink A and C 106 may be displayed in a text format on pages A and B 104, respectively. A user may select the text of the hyperlink A 106 (e.g. source hyperlink) from page A 104 and drag the text over to page B 104 using an input device (e.g. clicking and holding down on a mouse button). The user may continue dragging (e.g. continuing holding the mouse button down) the text of hyperlink A 106 onto page B 104 so that the text of hyperlink A 106 may overlap the text of hyperlink C (e.g. destination hyperlink). Once hyperlink A overlaps hyperlink C, the user may drop hyperlink A into hyperlink C (e.g. by releasing the mouse button) to form hyperlink pipeline C(A) 108. A second hyperlink pipeline C(A,B) 108 may be formed by dragging and dropping hyperlink B 106 (e.g. source hyperlink) from page A into hyperlink pipeline C(A) 108 (e.g. destination hyperlink). Hyperlink pipelines 108 may also be created by dragging and dropping hyperlinks within the same page 104. In one embodiment, hyperlink pipelines 108 may be displayed on pages 104 as a hyperlink 106. Other methods, such as copying and pasting and/or using human gestures (e.g. holding a source link with one finger and swiping the destination link towards the source with another finger) may be used to merge hyperlinks 106 together to form hyperlink pipelines 108. In one embodiment, merging the hyperlinks 106 together may not delete or remove the source hyperlink 106 and destination hyperlink 106 from page 104. In one embodiment, the source hyperlink may be a URI. The URI may be represented as URL pointing to a remote resource on an end node 110, a URI reference pointing to a local HTML element, and/or a URN comprising some string of characters, such as a telephone number, zip code, and/or currency that can serve as an input parameter to the destination hyperlink.

Hyperlink pipelines 108 may be executed the same way hyperlinks 106 are executed (e.g. a user clicks on the hyperlink pipeline 108). A user may execute the hyperlink pipelines 108 to invoke the different resources 112 associated with the different hyperlinks 106 within the hyperlink pipeline. In one embodiment, hyperlinks 106 within a hyperlink pipeline 108 may be executed such that the resources 112 referenced by the destination hyperlink are executed before resources referenced by the source hyperlink. For example, hyperlink pipeline C(A,B) may first execute resource C 112 associated with hyperlink C 106, then the resource A 112 associated hyperlink A 106, and finally the resource B 112 associated with hyperlink B 106. As discussed above, when creating hyperlink pipeline C(A,B) 108, hyperlink B 106 was the source hyperlink used to combine with hyperlink pipeline C(A) 108, and thus the web browser 102 may execute hyperlink B 106 last. Furthermore, hyperlink A 106 was the source hyperlink when creating hyperlink pipeline C(A) 108. As such, web browser 102 may execute hyperlink C before hyperlink A. Other execution orders may be employed when constructing hyperlink pipelines 108. Creating and executing the different resources embedded in the hyperlink pipeline 108 will be discussed in further detail below.

A user may save the hyperlink pipelines 108 into the local storage component within the user interface 101 and/or a remote storage location, such as a network server and a universal serial bus (USB) flash drive. In one embodiment, the hyperlink pipeline 108 may be saved as an HTML document that includes factory and pipeline information that will be discussed in more detail in FIG. 5. The user may also save the hyperlink pipelines 108 in other markup language documents. When the HTML document is loaded into the web browser 102, the hyperlink pipelines saved within the HTML documents may be loaded into the user interface's 101 memory. The resources 112 associated with hyperlink pipeline 108 may be validated in a variety of methods, such as using preflight Hypertext Transfer Protocol (HTTP) GET requests. The validation procedure may handle resource moves and update the hyperlink pipeline 108. Once a hyperlink pipeline 108 is validated, a user may then execute the hyperlink pipeline.

Figure 2A:
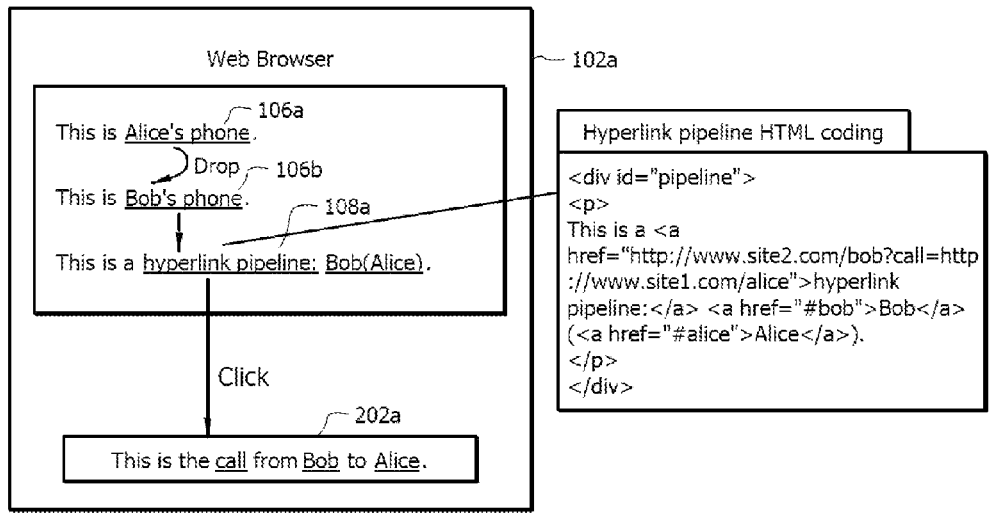
FIG. 2A is a schematic diagram of an embodiment of a web browser that comprises hyperlinks and a hyperlink pipeline.

FIG. 2A is a schematic diagram of an embodiment of a web browser 102a that comprises hyperlinks 106a and 106b and hyperlink pipeline 108a. Hyperlinks 106a and 106b, and hyperlink pipeline 108a may be located on one or more pages. For example, web browser 102a may be displaying Internet related information using two different pages. The first page may include hyperlinks 106a and 106b, while the second page may include hyperlink pipeline 108a. As shown in FIG. 2A, hyperlink 106a may be displayed as "Alice's phone" in a text format, while hyperlink 106b may be displayed as "Bob's phone" in a text format. A user that executes hyperlink 106a may invoke a resource that calls "Alice's phone," while a user that executes hyperlink 106b may invoke a resource that calls "Bob's phone." Within the web browser 102a, the user may drag and drop hyperlink 106a into hyperlink 106b to form hyperlink pipeline 108a. Hyperlink pipeline 108a may appear in a text format as "hyperlink pipeline: Bob(Alice)." FIG. 2A illustrates the HTML code used to construct hyperlink pipeline 108a.

When a user executes the hyperlink pipeline 108a, the service 202 may be performed based on the order of the hyperlinks. In FIG. 2A, because hyperlink 106a was dragged and dropped into hyperlink 106b, service 202a may call Alice's phone using Bob's phone.

Figure 2B:
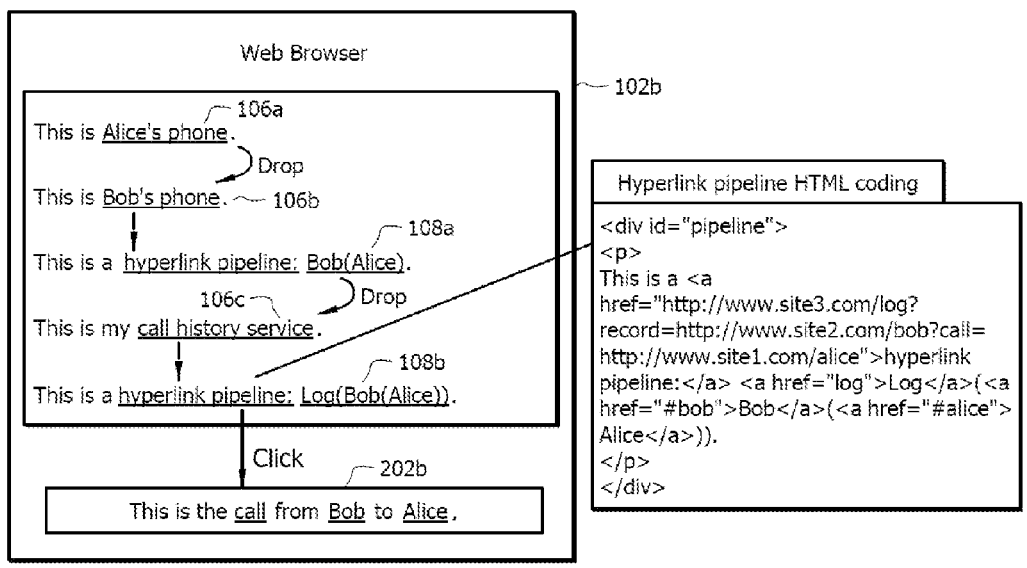
FIG. 2B is a schematic diagram of another embodiment of a web browser that comprises hyperlinks and hyperlink pipeline.

FIG. 2B is a schematic diagram of another embodiment of a web browser 102b that comprises hyperlinks 106a-c and hyperlink pipeline 108a and 108b. Hyperlink 106c may be displayed in a text format as "call history service," and correspond to a resource that logs telephone calls. After a user creates hyperlink pipeline 108a as described in FIG. 2A, the hyperlink pipeline 108a may be dragged and dropped into hyperlink 106c. FIG. 2B illustrates that a hyperlink pipeline 108a may be the source hyperlink, while hyperlink 106c may be the destination hyperlink when creating hyperlink pipeline 108b. Hyperlink pipeline 108d may be displayed in a text format as "hyperlink pipeline: Log(Bob(Alice))," and encoded using HTML as shown in FIG. 2B. When a user executes the hyperlink pipeline 108b, the service 202b may call Alice's phone using Bob's phone and log the call into a call history service referenced by hyperlink 106c. The execution order of the hyperlink pipeline 108b may be the execution of hyperlink 106c, then hyperlink 106b, and finally hyperlink 106a.

Figure 2C:
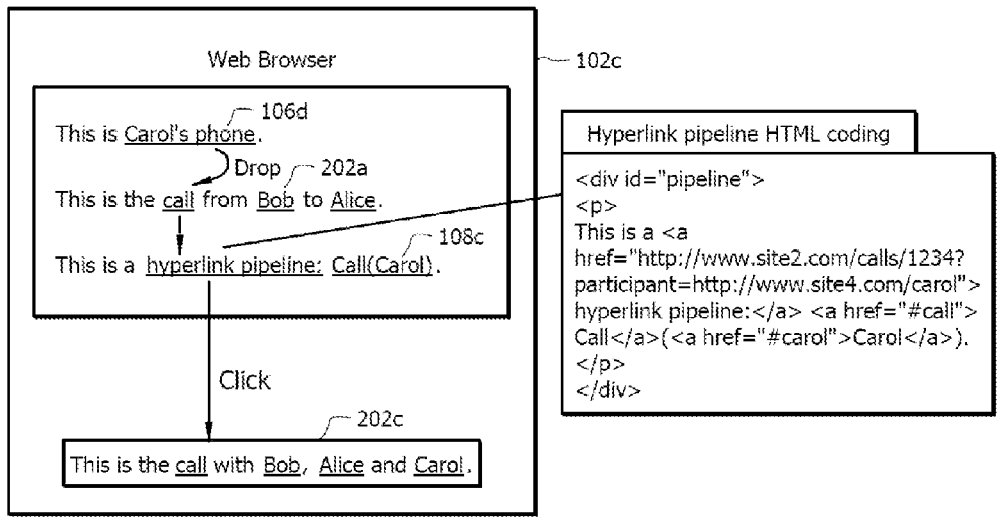
FIG. 2C is a schematic diagram of another embodiment of a web browser that comprises hyperlink and hyperlink pipeline.

FIG. 2C is a schematic diagram of another embodiment of a web browser 102c that comprises hyperlink 106d and hyperlink pipeline 108c. Hyperlink 106d may be displayed as "Carol's phone" in a text format, and when a user executes hyperlink 106d, the user may invoke a resource that calls "Carol's phone." Web browser 102c may also be performing the service 202a that calls "Alice's phone" using "Bob's phone" as described in FIG. 2A. While Web browser 102c is performing the service 202a, a user may drag and drop hyperlink 106c into service 202a to form hyperlink pipeline 108c. Hyperlink pipeline 108c may appear in a text format as "hyperlink pipeline: Call(Carol)," with HTML code as shown in FIG. 2C. When a user executes the hyperlink pipeline 108c, service 202b may perform a call that includes Carol, Bob, and Alice.

Figure 2D:
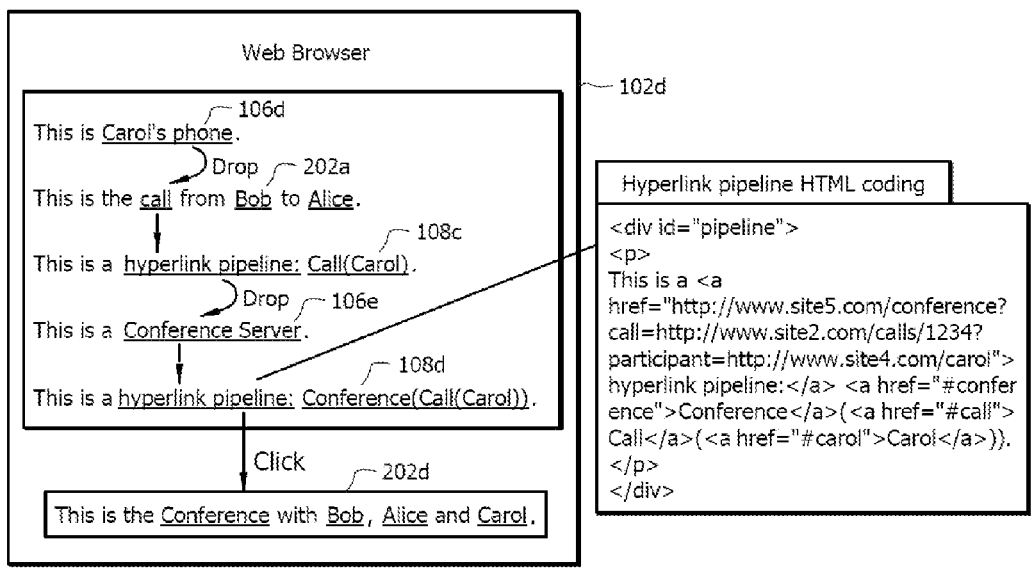
FIG. 2D is a schematic diagram of another embodiment of a web browser that comprises hyperlink and hyperlink pipelines.

FIG. 2D is a schematic diagram of another embodiment of a web browser 102d that comprises hyperlink 106d and 106e and hyperlink pipelines 108c and 108d. Hyperlink 106e may be displayed as "Conference Server" in a text format, and when a user executes hyperlink 106e, the user may invoke a resource that moves a phone call to a separate conference server that has sufficient bandwidth and data capacity. After a user creates hyperlink pipeline 108c as described in FIG. 2C, the hyperlink pipeline 108c may be dragged and dropped into hyperlink 106e to form hyperlink pipeline 108d. Hyperlink pipeline 108d may appear in a text format as "hyperlink pipeline: Conference (Call(Carol))," which may be encoded in HTML code as shown in FIG. 2C. When a user executes hyperlink pipeline 108d, service 202b may perform a call that includes Carol, Bob, and Alice using a conference server that corresponds to hyperlink 106e.

Figure 3:
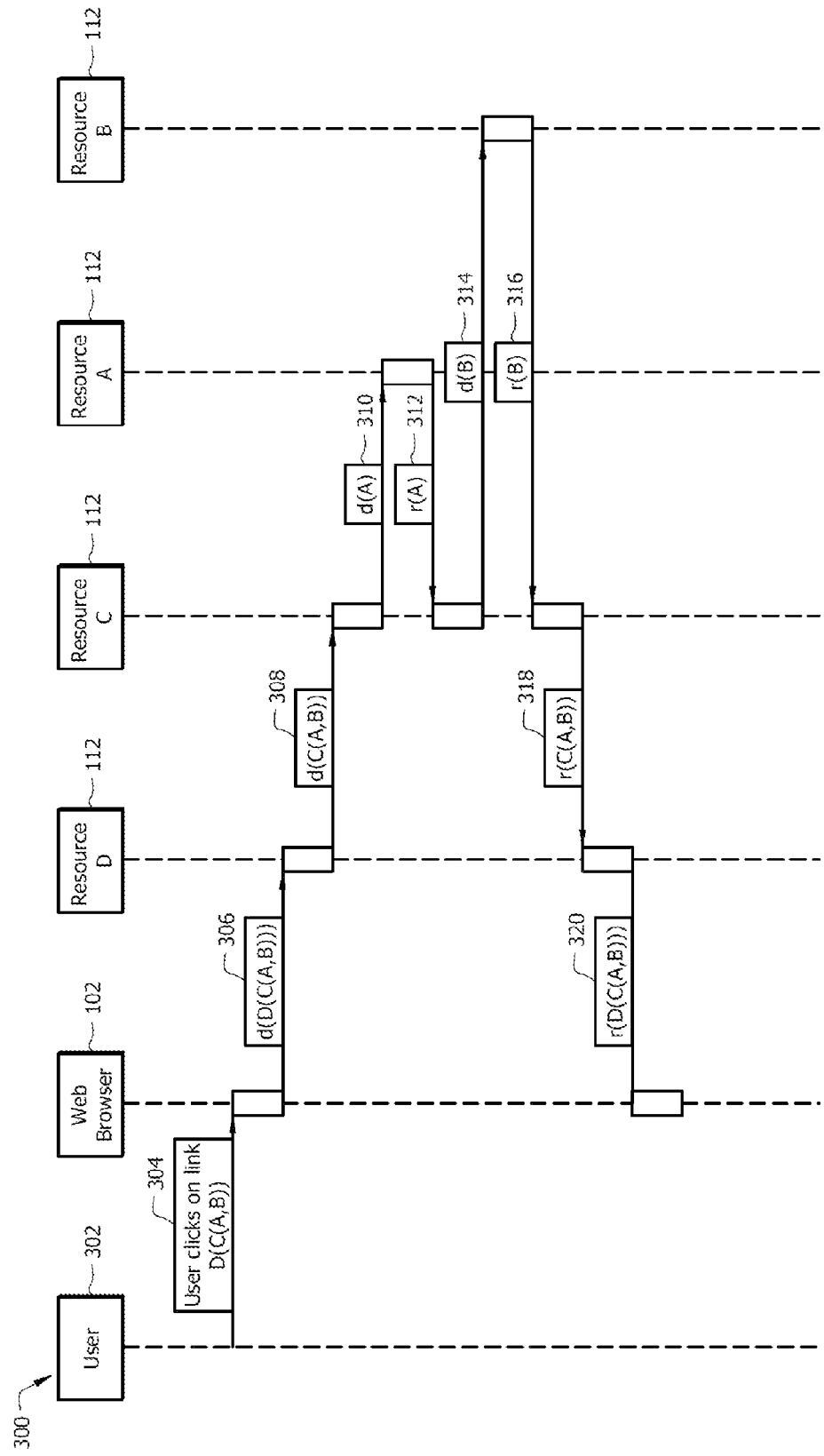
FIG. 3 is a protocol diagram of an embodiment of a message exchange process for executing the hyperlink pipeline.

FIG. 3 is a protocol diagram of an embodiment of a message exchange process 300 for executing a hyperlink pipeline. A user may construct the hyperlink pipeline D(C(A,B)) as described in FIG. 1. Recall, a user may drag and drop hyperlink A into hyperlink C to create hyperlink pipeline C(A). Next, the user may drag and drop hyperlink B into hyperlink pipeline C(A) to form hyperlink pipeline C(A,B). Afterwards, the user may drag and drop hyperlink pipeline C(A,B) into hyperlink D to form hyperlink pipeline D(C(A,B)). The user may subsequently execute the hyperlink pipeline D(C(A,B)) by clicking on the hyperlink pipeline D(C(A,B)) and invoke resources associated with the embedded hyperlinks. As discussed above, hyperlink pipeline D(C(A,B)) may execute the destination hyperlinks before source hyperlinks. As a result, the hyperlinks within hyperlink pipeline D(C(A,B)) may be executed in the following order: hyperlink D is executed first, then hyperlink C, then hyperlink A, and lastly hyperlink B. Hyperlinks A-D may correspond to resources A-D 112, respectively. Prior to the execution of hyperlink pipelines D(C(A,B)), resource authorization protocols may be used to grant access to resources A-D 112.

The message exchange process 300 starts when a user 302 executes hyperlink pipeline D(C(A,B)) by using an input device, such as using a mouse to click on the hyperlink pipeline D(C(A,B)) 304 within web browser 102. Once the user 302 clicks on the hyperlink pipeline D(C(A,B)) 304, the web browser 102 may send a dereference message d(D(C(A,B))) 306 to invoke resource D 112. In one embodiment, the dereference message d(D(C(A,B))) 306 may be encoded using a HTML protocol as defined in the IETF Request for Comments (RFC) 2616, published June 1999, which is incorporated herein as if reproduced by its entirety, and may pass parameters that identify addresses of resources A-D 112. Web browser 102 may maintain and/or encode the execution order when transmitting the dereference message d(D(C(A,B))) 306 to resource D 112. Recall that hyperlink D may be executed first as the destination hyperlink, and thus dereference message d(D(C(A,B))) 306 is sent to resource D.

Once resource D 112 receives the dereference message d(D(C(A,B))) 306, resource D 112 may be invoked by extracting the relevant parameters that pertain to resource D 112 and send a dereference message d(C(A,B)) 308 to invoke resource C 112. Resource D 112 may know to send dereference message d(C(A,B)) 308 to resource C based on the execution order information transmitted within dereference message d(D(C(A,B))) 306. Resource C 112 receives dereference message d(C(A,B)) 308 since hyperlink C is executed after hyperlink D. Similar to dereference message d(D(C(A,B))) 306, dereference message d(C(A,B)) 308 may pass parameters that identify the address of resources A-C 112. Moreover, dereference message (C(A,B)) 308 may include information regarding the execution order of the hyperlink pipeline D(C(A,B)) similar to the dereference message d(D(C(A,B))) 306. Hence, resource C 112 may then transmit a dereference message d(A) 310 to invoke resource A 112 based on the order of execution.

Dereference message d(A) 310 may be substantially similar to dereference message d(C(A,B)) 308, except that dereference message d(A) 310 passes parameters associated with hyperlink A. The dereference message d(A) 310 may include information regarding the execution order of the hyperlink pipeline D(C(A,B)). After resource A 112 receives the dereference message d(A) 310 from resource C 112, resource A 112 may send a response message r(A) 312 back to resource C 112. In one embodiment, prior to send response message r(A), one or more messages that are not shown in FIG. 3 may be exchanged between resource A 112 and resource C 112. These messages may perform authentication, service selection and/or other tasks as dictated by the resources. Another embodiment may have no message exchanges between the two resources. Resource A 112 may not transmit a dereference message to another resource after being invoked because no additional parameters corresponding to another resource 112 was sent within dereference message d(A) 310. Response message r(A) 312 may be encoded using a HTTP protocol, and may pass information as a result of invoking resource A 112 back to resource C 112. Using FIG. 2D as an example, resource A 112 may correspond to "Bob's phone," and thus response message r(A) 312 may comprise information to communicate with Bob's phone.

After resource C 112 receives response message r(A) 312, resource C 112 may send a dereference message d(B) 314 that is substantially similar to dereference message d(A) 314 to resource B 112. Resource B 112 may then send a response message r(B) 316 back to resource C 112. As discussed above, in one embodiment, messages not shown in FIG. 3 may be exchanged between the two resources prior to transmitting response message response message r(B) 316. The response message r(B) 316 may be substantially similar to response message r(A) 312 except that response message r(B) 316 may comprise information that is the result of invoking resource B. Using FIG. 2D as an example, response message r(B) 316 may comprise information to communication with "Alice's phone."

Resource C 112 may subsequently combine the information from response message r(A) 312 and response message r(B) 316 with its own information resulting from receiving deference message d(C(A,B)) 308 and send a response message r(C(A,B)) 318 to resource D 112. Recall that in one embodiment, messages not shown in FIG. 3 may be exchanged between the two resources prior to transmitting response message response message r(C(A,B)) 318. Using FIG. 2D as an example, resource C 112 may correspond to "Carol's phone," and thus response message r(C(A,B)) may comprise information to establish communication between Carol's phone, Alice's phone, and Bob's phone. Once resource D 112 receives a response message r(C(A,B)) 318 from resource C 112, resource D 112 may combine its own information with response message r(C(A,B)) 318 to generate and transmit response message r(D(C(A,B))) 320 to web browser 102. As stated above, messages not shown in FIG. 3 may be exchanged between the two resources prior to transmitting response message r(D(C(A,B))) 320. At this point, the web browser receives response message r(D(C(A, B))) 320 and provides the service established in the hyperlink pipeline (D(C(A,B))). In FIG. 2D, response message r(D(C(A,B))) 320 sent to web browser 102 would execute a call with Bob, Alice, and Carol using a separate conference server.

In one embodiment, the dereference messages 306, 308, 310, and 314 and response messages 312, 316, 318, and 320 may be formatted as an HTTP message, containing HTML and Extensible Markup Language (XML). The formatting may vary and may depend on the resource 112 that is receiving the dereference messages or the response messages. For example, resource D 112 may be configured to accept XML messages, while resource C 112 may be configured to accept HTML message. When web browser 102 sends dereference message d(D(C(A,B))) 306 to resource D 112, the dereference message d(D(C(A,B))) 306 may be formatted in XML. However, when resource D 112 sends dereference message d(C(A,B)) 308 to resource C 112, the message may be formatted in HTML. Modification of the HTTP message format may be implemented through HTTP content negotiation as described in IETF RFC 2616.

Figure 4:
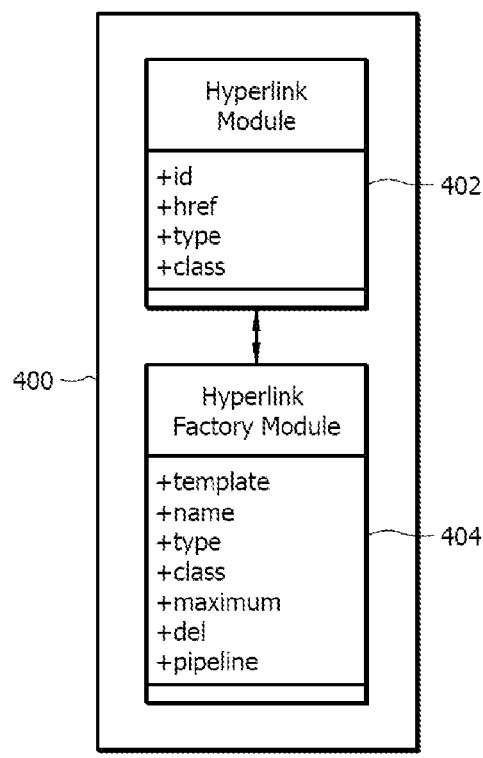
FIG. 4 is a schematic diagram of an embodiment of a hyperlink.

FIG. 4 is a schematic diagram of an embodiment of a hyperlink 400. Hyperlink 400 may be substantially similar to hyperlink 106 as shown in FIG. 1 and may comprise a hyperlink module 402 and a hyperlink factory module 404. In another embodiment, hyperlink 400 may comprise a hyperlink module 402 without the hyperlink factory module 404. The hyperlink module 402 may comprise hyperlink attributes, as defined in the HTML Living Standard of the Web Hypertext Application Technology Working Group (WHATWG), which is incorporated herein as if reproduced by its entirety. More specifically, as shown in FIG. 4, hyperlink module 402 may comprise an identifier (id) attribute, a hypertext reference attribute (href), a type attribute, and a class attribute. The id attribute assigns a unique identifier for the hyperlink module 402. The href attribute may indicate the address that corresponds to the resource associated with the hyperlink 400. The href attribute may be a URI that may be represented as a URL address or a URI reference address. In another embodiment, the href attribute may be a URN represented by plain text, such as a telephone number, zip code, or currency that can serve as an input parameter to the destination hyperlink. The type attribute may indicate the type of resource linked to the hyperlink module 402. The class attribute may indicate the class associated for each resource. The class attribute may be a semantic class used to classify similar resources and/or media types.

The hyperlink factory module 404 may comprise a template attribute, a name attribute, a type attribute, a class attribute, a maximum attribute, a delimiter (del) attribute, and a pipeline attribute. The template attribute may be a URI template as defined in the IETF RFC 6570, published March 2012, which is incorporated herein as if reproduced by its entirety. The URI template may comprise a single variable that may be substituted by URIs that corresponds to source hyperlinks. The name attribute may name the single variable in the URI template. The type attribute may list the accepted resource types for the variable, while the class may list the accepted classes for the variable. For example, a hyperlink associated with a resource that provides a video-chat service may not be combined to form a hyperlink pipeline with hyperlink associated with a resource that corresponds to an image. The maximum attribute may indicate the maximum number of substitutions for the variable. The maximum attribute may have a default value of "1," and thus may allow one substitution. If the number of substitution is unlimited or is unbounded by a specific number, then the maximum attribute may have a value of "−1." The del attribute separates the multiple substitutions of the variable using a symbol such as ";" symbol. The pipeline attribute may represent the URI of the hyperlink 400 and may be reserved for when a user creates a hyperlink pipeline. Using FIG. 2A as an example, Table 1 is an example of encoding the hyperlink factory module 404 for hyperlink 106a using Microdata. Other markup languages may be used to encode the hyperlink factory module 404, such as Microformat and Resource Description Framework (RDFa).

TABLE 1

```
<p>
This is <a href="http://www.site1.com/alice" id="alice"
itemscope itemtype="http://www.pipe-dict.com/factory">Alice's phone
<span itemprop="http://www.pipe-dict.com/type" hidden="hidden">text/html</span>
<span itemprop="http://www.pipe-dict.com/class"
```

TABLE 1-continued

```
hidden="hidden">http://www.example.com/tags#phone</span>
<span itemprop="http://www.pipe-dict.com/max" hidden="hidden">1</span>
<span itemprop="http://www.pipe-dict.com/name" hidden="hidden">phone</span>
<span itemprop="http://www.pipe-dict.com/template"
hidden="hidden">{$href}?call={phone}</span>
<span itemref="http://www.pipe-dict.com/pipeline"
hidden="hidden">http://www.site2.com/page1#pipeline</span>
</a>.
</p>
http://www.pipe-dict.com/factory
      http://www.pipe-dict.com/type=text/html
      http://www.pipe-dict.com/class= http://www.example.com/tags#phone
      http://www.pipe-dict.com/max=1
      http://www.pipe-dict.com/name=phone
      http://www.pipe-dict.com/template={$href}?call={phone}
      http://www.pipe-dict.com/target=http://www.site2.com/page1#pipeline
      http://www.pipe-dict.com/del=;
```

Figure 5:
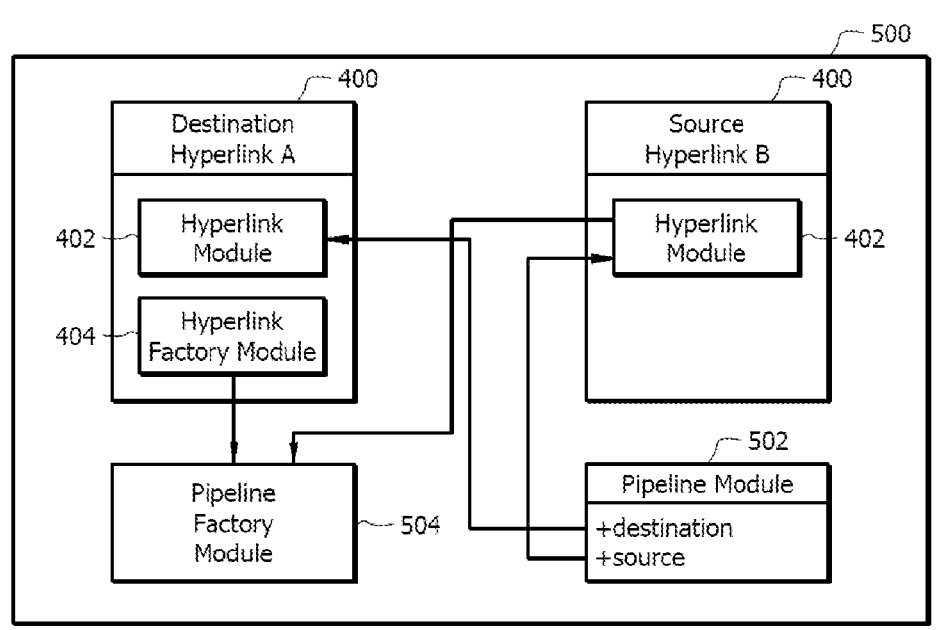
FIG. 5 is a schematic diagram of an embodiment of a hyperlink pipeline.

FIG. 5 is a schematic diagram of an embodiment of a hyperlink pipeline 500. Hyperlink pipeline 500 may be substantially similar to hyperlink pipeline 108 as shown in FIG. 1. Hyperlink pipeline 500 may comprise one or more hyperlinks 400, a pipeline module 502, and a pipeline factory module 504. The pipeline module 502 may be substantially similar to hyperlink module 402 such that the pipeline module 502 may inherit the functionality found in hyperlink module 402 of hyperlink 400. Using FIG. 2B as an example, the pipeline module 502 corresponding to hyperlink pipeline 108b may inherit the functionality found within the hyperlink unit 402 of hyperlink 106a. By inheriting the functionality, hyperlink pipeline 108b may be displayed as a text (e.g. "hyperlink pipeline: Log(Bob(Alice))") similar to hyperlink 106a (e.g. "Alice's phone"), rather than an image or short video clip. Moreover, a user may execute the hyperlink pipeline 108b by clicking on the text of the hyperlink pipeline 108b. In addition to inheriting the functionality of hyperlink module 402, pipeline module 502 may further comprise a destination attribute and a source attribute to store the URIs for the source hyperlink and destination hyperlink. Using FIG. 2A as an example, the source attribute for hyperlink pipeline 108a may indicate the URI for "Alice's phone," while the destination attribute for hyperlink pipeline 108a may indicate the URI for "Bob's phone." In FIG. 5, the pipeline module 502 may obtain the source attribute from hyperlink B 400 and the destination attribute from hyperlink A 400. The pipeline module 502 may use the destination attribute and source attribute to perform a validity check of the hyperlinks embedded into the hyperlink pipeline 500. In one embodiment, the validity check may dereference the destination and source attributes through preflight HTTP GET requests. Using FIG. 2A as an example, Table 2 is an example of encoding the pipeline module 502 for hyperlink pipeline 108a using Microdata.

TABLE 2

```
<p>
This is <a href="http://www.site2.com/bob?call=http://www.site1.com/
alice" id="pipeline"
itemscope itemtype="http://www.pipe-dict.com/pipeline">a pipeline
<span itemprop="http://www.pipe-dict.com/destination"
hidden="hidden">http://www.site2.com/bob</span>
<span itemprop="http://www.pipe-dict.com/source"
hidden="hidden">http://www.site1.com/alice</span>
</a>
</p>
http://www.pipe-dict.com/pipeline
   http://www.pipe-dict.com/href=
   http://www.site2.com/bob?call=http://www.site1.com/alice
```

TABLE 2-continued

```
   http://www.pipe-dict.com/destination=http://www.site2.com/bob
   http://www.pipe-dict.com/source=http://www.site1.com/alice
```

The pipeline factory module 504 may be substantially similar to the hyperlink factory module 404 as shown in FIG. 4. The attributes from the pipeline factory module 504 may be initially derived from destination hyperlink A 404. The hyperlink factory module 404 from the destination hyperlink A 400 may be copied and reused as the pipeline factory module 504. After merging the source hyperlink B 400 with the destination hyperlink A 400, attributes within the pipeline factory module 504 may be updated with the attributes from the source hyperlink module 402. For example, the template attribute from the destination's hyperlink factory module 404 may be updated with the source URI from the source hyperlink module 402 (e.g. source hyperlink B) to form the pipeline factory module 504. Although FIG. 5 illustrates that hyperlink pipeline 500 comprises two hyperlinks, other embodiments of hyperlink pipelines 500 may comprise more than two hyperlinks. In one embodiment, source hyperlink B may not comprise a hyperlink factory module 404. In another embodiment where the source hyperlink B 400 comprises a hyperlink factory module 4040 that may not be used to form hyperlink pipeline 500.

Figure 6:
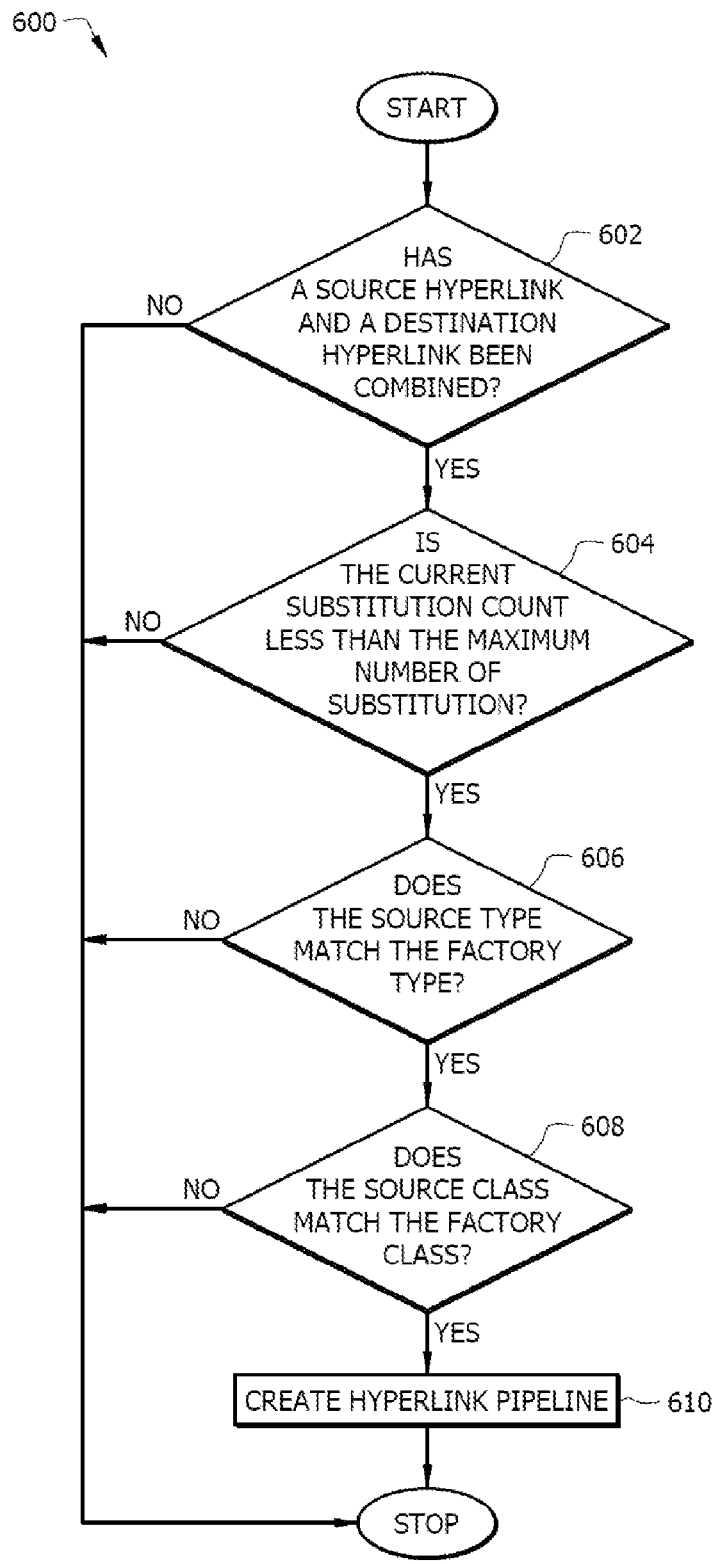
FIG. 6 is a flowchart of an embodiment of a method that constructs a hyperlink pipeline using a source hyperlink and destination hyperlink.

FIG. 6 is a flowchart of an embodiment of a method 600 that constructs a hyperlink pipeline using a source hyperlink and destination hyperlink. Method 600 starts at step 602 by determining whether a source hyperlink and a destination hyperlink have been combined to form a hyperlink pipeline. In one embodiment, both the source hyperlink and destination hyperlink may be a hyperlink 106 as described in FIG. 1. Other embodiments may have either the source hyperlink or the destination hyperlink a hyperlink pipeline 108 as described in FIG. 1, or both the source hyperlink and the destination hyperlink may be hyperlink pipelines 108. As discussed above, a user may drag-and-drop, cut-and-paste, and/or use other gestures to combine the source hyperlink with the destination hyperlink. If a source hyperlink and destination hyperlink are not combined together to form a hyperlink pipeline, then method 600 stops. Method 600 may proceed to step 604 when a user combines a source hyperlink with a destination hyperlink to form a hyperlink pipeline.

At step 604, method 600 determines whether the current substitution count is less than the maximum number of substitutions for the hyperlink. As discussed in FIG. 4, the hyperlink factory unit 404 may comprise a maximum attribute that indicates the maximum number of substitutions for hyperlink 400. In one embodiment, when a source hyperlink is combined with a destination hyperlink, method 600 may use the hyperlink factory unit 404 associated with the destination hyperlink to determine the maximum number of substitutions. Method 600 may also determine the current substitution count based off the template attribute from the hyperlink factory unit 404 associated with destination hyperlink. Method 600 may compare the current substitution count with the maximum value obtained from the hyperlink factory unit 404 associated with destination hyperlink. If the current substitution count has reached the maximum value, then method 600 stops. Conversely, if the current substitution count has not reached the maximum value, then method 600 continues to step 606.

At step 606, method 600 may determine whether the type attribute from the source hyperlink matches one of the type attributes listed in the hyperlink factory unit 404 associated with the destination hyperlink. Method 600 may obtain the type attribute of the source hyperlink from the hyperlink module 402 associated with source hyperlink. Recall that the type attribute indicates the media type of the resource associated with the source hyperlink. Method 600 may compare the media type from the source hyperlink with one or more media types listed in the type attribute of the hyperlink factory unit 404 associated with the destination hyperlink. If method 600 determines that the media type from the source hyperlink does not match a media type attribute listed in the hyperlink factory unit 404, method 600 stops. However, when a match does occur, method 600 may continue to step 608. As stated above, the source hyperlink and/or destination hyperlink may be hyperlink pipeline 500 as described in FIG. 5.

At step 608, method 600 may determine whether the class attribute from the source hyperlink matches one of the class attribute listed in the hyperlink factory unit 404 associated with the destination hyperlink. As discussed above, the class attribute from the hyperlink module 402 indicates the semantic class associated with the hyperlinks. Method 600 may obtain the class from the hyperlink module 402 associated with source hyperlink, and may compare the class from the source hyperlink with one or more class listed in the class attribute of the hyperlink factory unit 404 associated with the destination hyperlink. If method 600 determines that the class from the source hyperlink does not match a class listed in the hyperlink factory unit 404, method 600 stops. However, when a match does occur, method 600 may continue to step 610. At step 608, method 600 may create a hyperlink pipeline. Method 600 may copy the hyperlink factor module 404 from the destination hyperlink and use the hyperlink factor module 404 as the pipeline factor module 504 shown in FIG. 5. Method 600 may update the attributes of the pipeline factory module 504. For example, the variable within the template attribute may be updated by substituting the source URI and a del character. Method 600 may also update the URI within the pipeline attribute found in the pipeline factor module 504. Method 600 may also create the pipeline module 502 and update the source attribute in the pipeline module 502 with the source URI from the source hyperlink and the destination attribute from the destination URI from the destination hyperlink.

Figure 7:
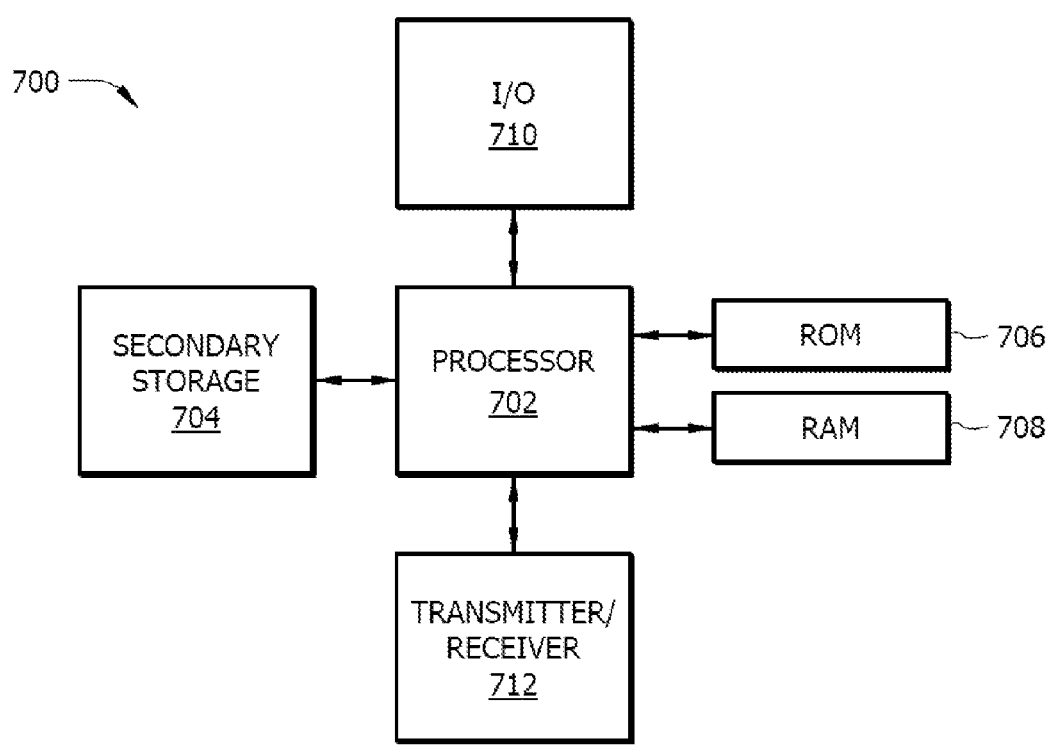
FIG. 7 is a schematic diagram of one embodiment of a general-purpose computer system suitable for implementing the several embodiments of the disclosure.

The schemes described above may be implemented on any general-purpose computer system, such as a computer or network component with sufficient processing power, memory resources, and network throughput capability to handle the necessary workload placed upon it. FIG. 7 illustrates a schematic diagram of a general-purpose computer system 700 suitable for implementing one or more embodiments of the methods disclosed herein, such as the user interface 101, web browser 102, end nodes 110, hyperlink module 402, hyperlink factory module 404, pipeline module 502, and pipeline factory module 504. The computer system 700 includes a processor 702 (which may be referred to as a CPU) that is in communication with memory devices including secondary storage 704, read only memory (ROM) 706, random access memory (RAM) 708, transmitter/receiver 712, and input/output (I/O) device 710. Although illustrated as a single processor, the processor 702 is not so limited and may comprise multiple processors. The processor 702 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 702 may be configured to implement any of the schemes described herein, such as the user interface 101, web browser 102, hyperlink module 402, hyperlink factory module 404, pipeline module 502, pipeline factory module 504, and method 600. The processor 702 may be implemented using hardware, software, or both.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs that are loaded into the RAM 708 when such programs are selected for execution. The ROM 706 is used to store instructions and perhaps data that are read during program execution. The ROM 706 is a non-volatile memory device that typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704. The secondary storage 704, ROM 706, and/or RAM 708 may be non-transitory computer readable mediums and may not include transitory, propagating signals. Any one of the secondary storage 704, ROM 706, or RAM 708 may be referred to as a memory, or these modules may be collectively referred to as a memory. Any of the secondary storage 704, ROM 706, or RAM 708 may be used to store hyperlinks pipelines 108 as described herein. The processor 702 may generate the hyperlinks pipelines 108 and store the hyperlinks pipelines 108 in memory and/or retrieve the hyperlinks pipelines 108 from memory.

The transmitter/receiver 712 may serve as an output and/or input device of the user interface 101, hyperlink module 402, hyperlink factory module 404, pipeline module 502, and pipeline factory module 504. For example, if the transmitter/receiver 712 is acting as a transmitter, it may transmit data out of the computer system 700. If the transmitter/receiver 712 is acting as a receiver, it may receive data into the computer system 700. The transmitter/receiver 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 712 may enable the processor 702 to communicate with an Internet or one or more intranets. I/O devices 710 may include a video monitor, liquid crystal display (LCD), touch screen display, or other type of video display for displaying video, and may also include a video recording device for capturing video. I/O devices 710 may also include one or more keyboards, mice, or track balls, or other well-known input devices.

It is understood that by programming and/or loading executable instructions onto the computer system 700, at least one of the processor 702, the RAM 708, and the ROM 706 are changed, transforming the computer system 700 in part into a particular machine or apparatus, e.g., invoking resources 112, having the novel functionality taught by the present disclosure. It is fundamental to the electrical engineering and software engineering arts that functionality that can be implemented by loading executable software into a computer, which can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for forming a hyperlink pipeline that organizes a plurality of resources within a web browser, comprising:
   a processor configured to:
      provide a presentation of a content via the web browser, the presentation including a first element and a second element, the first element indicating a source hyperlink comprising a source Uniform Resource Identifier (URI) that identifies a first resource, the second element indicating a destination hyperlink comprising a destination URI that identifies a second resource and a variable within a URI template;
      in response to receiving a user action to drop the first element into the second element via the presentation, generate a merged hyperlink from the source hyperlink and the destination hyperlink, wherein the merged hyperlink corresponds to a substitution of the source URI for the variable within the URI template in the source hyperlink with the destination hyperlink to form the hyperlink pipeline; and
      present a third element with the presentation of the content, the third element representing the merged hyperlink of the hyperlink pipeline, wherein the source URI is represented as a Uniform Resource Locator (URL), a URI reference, or a Uniform Resource Name (URN).

2. The apparatus of claim 1, wherein the processor is further configured to store the destination URI and the source URI when forming the hyperlink pipeline into a memory unit.

3. The apparatus of claim 2, wherein the processor is further configured to save the hyperlink pipeline into a local storage component and verify the destination URI and the source URI when retrieving the hyperlink pipeline.

4. The apparatus of claim. 1, wherein a dedicated composition server is not used to form the hyperlink pipeline.

5. The apparatus of claim 1, wherein a browser extension is not used to form the hyperlink pipeline.

6. The apparatus of claim 1, wherein the source hyperlink and the destination hyperlink originate from different web pages, and wherein the first resources and the second resources are on different services.

7. The apparatus of claim 1, wherein the processor is further configured to execute the hyperlink pipeline that invokes the second resource before the first resource.

8. The apparatus of claim 1, wherein the source hyperlink and the destination hyperlink are merged by moving the source link over to the destination link within the web browser.

9. The apparatus of claim 1, wherein the processor is further configured to load a web page into the web browser, wherein the hyperlink pipeline is displayed on the web page, and wherein the formation of the hyperlink pipeline occurs subsequently to the web page being loaded within the web browser.

10. The apparatus of claim 1, wherein the processor is further configured to determine a current substitution count and compare the current substitution count with a maximum substitution count, wherein the current substitution count indicates a number of substitutions for the variable that has occurred prior to the merger of the source hyperlink and the destination hyperlink, and wherein the maximum substitution count indicates a maximum number of substitutions for the hyperlink pipeline.

11. The apparatus of claim 10, wherein the processor is further configured to form a hyperlink pipeline when the current substitution count is less than the maximum number of substitutions and the first resource type.

12. The apparatus of claim 1, wherein the hyperlink pipeline is displayed as a hyperlink within the web browser and may be selected as a source hyperlink of another hyperlink pipeline with the user gesture.

13. An apparatus for forming a hyperlink pipeline that organizes a plurality of hyperlinks within a web browser, comprising:
a processor configured to:
create a factory module, wherein the factory module comprises:
a template attribute that indicates a Uniform Resource Identifier (URI) template, wherein the URI template comprises a variable;
a name attribute that indicates the name of the variable;
a type attribute that indicates a list of accepted media type for the variable; and
a pipeline attribute that indicates a URI of the hyperlink pipeline;
provide a presentation of a content via the web browser, the presentation including a first element and a second element, the first element indicating a source hyperlink comprising a source URI that identifies a first resource. the second element indicating a destination hyperlink comprising a destination URI that identifies a second resource and a variable within a URI template;
in response to receiving a user action to drop the first element into the second element via the presentation. generating a merged hyperlink from the source hyperlink and the destination hyperlink, wherein the merged hyperlink corresponds to a substitution of the source URI that corresponds to the source hyperlink into the variable.

14. The apparatus of claim 13, wherein the factory module further comprises a delimiter attribute that indicates a delimiter used to separate multiple substitutions of the variable, wherein the variable comprises a plurality of URIs, wherein the source URI is added to the plurality of URIs when forming the hyperlink pipeline, and wherein the plurality of URIs and the source URI are separated by the delimiter.

15. The apparatus of claim 13, wherein the source hyperlink further comprises a source type attribute that indicates the media type for the source hyperlink, and wherein the processor is further configured to form the hyperlink pipeline when the source type attribute matches one of the media types found in the type attribute.

16. The apparatus of claim 13, wherein the URI template further comprises a class attribute that indicates a list of accepted classes for the variable, wherein the source hyperlink comprises a source class attribute that indicates the class for the source hyperlink, and wherein the processor is further configured to form the hyperlink pipeline when the source class attribute matches one of the accepted classes found in the class attribute.

17. The apparatus of claim 13, wherein the URI template further comprises a maximum attribute that indicates the maximum number of substitutions for the variable, and wherein the processor is further configured to set a maximum number of substitutions into the variable according to the maximum attribute.

18. A method for composing and executing a plurality of hyperlink pipelines within a web browser, wherein the method comprises:
providing a presentation of a content via a web browser, the presentation including a first element a second element, and a third element, the first element indicating a first source hyperlink comprising a source Uniform Resource Identifier (URI) that identifies a first resource, the second element indicating destination hyperlink comprising a destination URI that identifies a second resource and a variable within a URI template, the third element indicating a second source hyperlink that corresponds to a third resource;
in response to receiving a user action to drop the first element into the second element via the presentation, moving the first source hyperlink that corresponds to the first resource to the destination hyperlink that corresponds to the second resource and merging the first source hyperlink with the destination hyperlink to create a first hyperlink pipeline;
in response to receiving another user action to drop the third element into the first hyperlink pipeline via the presentation moving the second source hyperlink that corresponds to the third resource to the first hyperlink pipeline and merging the second source hyperlink with the first hyperlink pipeline to create a second hyperlink pipeline; and executing the second hyperlink pipeline such that the second resource is invoked before the first resource and the third resource, and the first resource is invoked before the third resource.

19. The method of claim 18, wherein a first dereference message is sent to the second resource from the web browser, wherein a second dereference message is subsequently sent from the second resource to the first resource, and wherein the first source hyperlink is a third hyperlink pipeline.

20. The method of claim 19, wherein the first dereference message comprises a plurality of first parameters associated with the first resource, the second resource, and the third resource, and wherein the second dereference message comprises a plurality of second parameters associated with the first resource and the third resource.

* * * * *

UNITED STATES PATENT AND TRADEMARK OFFICE
CERTIFICATE OF CORRECTION

| | | |
|---|---|---|
| PATENT NO. | : 9,552,338 B2 | Page 1 of 2 |
| APPLICATION NO. | : 13/793066 | |
| DATED | : January 24, 2017 | |
| INVENTOR(S) | : Li et al. | |

It is certified that error appears in the above-identified patent and that said Letters Patent is hereby corrected as shown below:

In the Specification
Column 9, Line 22, delete "deference message" and insert -- dereference message --.

In the Claims
Column 17, Lines 50-67, through Column 18, Lines 1-12, Claim 13 should read:
13. An apparatus for forming a hyperlink pipeline that organizes a plurality of hyperlinks within a web browser, comprising:
    a processor configured to:
        create a factory module, wherein the factory module comprises:
            a template attribute that indicates a Uniform Resource Identifier (URI)
                template, wherein the URI template comprises a variable;
            a name attribute that indicates the name of the variable;
            a type attribute that indicates a list of accepted media type for the variable;
                and
            a pipeline attribute that indicates a URI of the hyperlink pipeline;
        provide a presentation of a content via the web browser, the presentation including a
            first element and a second element, the first element indicating a source
            hyperlink comprising a source URI that identifies a first resource, the second
            element indicating a destination hyperlink comprising a destination URI that
            identifies a second resource and a variable within a URI template;
        in response to receiving a user action to drop the first element into the second element
            via the presentation, generating a merged hyperlink from the source
            hyperlink and the destination hyperlink, wherein the merged hyperlink
            corresponds to a substitution of the source URI that corresponds to the source
            hyperlink into the variable.

Signed and Sealed this
Fourth Day of April, 2017

Michelle K. Lee
*Director of the United States Patent and Trademark Office*

CERTIFICATE OF CORRECTION (continued)
U.S. Pat. No. 9,552,338 B2

Column 18, Lines 41-67, through Column 19, Lines 1-4, Claim 18 should read:

18. A method for composing and executing a plurality of hyperlink pipelines within a web browser, wherein the method comprises:

providing a presentation of a content via a web browser, the presentation including a first element, a second element, and a third element, the first element indicating a first source hyperlink comprising a source Uniform Resource Identifier (URI) that identifies a first resource, the second element indicating a destination hyperlink comprising a destination URI that identifies a second resource and a variable within a URI template, the third element indicating a second source hyperlink that corresponds to a third resource;

in response to receiving a user action to drop the first element into the second element via the presentation, moving the first source hyperlink that corresponds to the first resource to the destination hyperlink that corresponds to the second resource and merging the first source hyperlink with the destination hyperlink to create a first hyperlink pipeline;

in response to receiving another user action to drop the third element into the first hyperlink pipeline via the presentation, moving the second source hyperlink that corresponds to the third resource to the first hyperlink pipeline and merging the second source hyperlink with the first hyperlink pipeline to create a second hyperlink pipeline; and executing the second hyperlink pipeline such that the second resource is invoked before the first resource and the third resource, and the first resource is invoked before the third resource.